(12) United States Patent
Serres Vives et al.

(10) Patent No.: US 6,906,289 B2
(45) Date of Patent: Jun. 14, 2005

(54) APPARATUS FOR HEATING A VESSEL CONTAINING FOODSTUFFS

(75) Inventors: Gerald Serres Vives, Eloise (FR); Patrick De Wasseige, Moye (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/469,310

(22) PCT Filed: Nov. 6, 2002

(86) PCT No.: PCT/FR02/03792

§ 371 (c)(1),
(2), (4) Date: Aug. 29, 2003

(87) PCT Pub. No.: WO03/039310

PCT Pub. Date: May 15, 2003

(65) Prior Publication Data

US 2004/0074395 A1 Apr. 22, 2004

(30) Foreign Application Priority Data

Nov. 7, 2001 (FR) .............................. 01 14406

(51) Int. Cl.⁷ .............................................. A47J 26/36
(52) U.S. Cl. ..................................... 219/386; 392/442
(58) Field of Search ............................... 219/385–388; 392/441–442

(56) References Cited

U.S. PATENT DOCUMENTS

| 1,828,628 | A | 10/1931 | Torgerson |
| 1,977,482 | A | 1/1934 | Klaus |
| 4,088,444 | A | 5/1978 | Byrne |
| 5,280,748 | A | 1/1994 | Pardo |

FOREIGN PATENT DOCUMENTS

| DE | 878 990 | 6/1953 |
| FR | 2 721 381 | 12/1995 |
| FR | 2 753 071 | 3/1998 |
| FR | 2 788 677 | 7/2000 |
| WO | WO 01/58328 | 8/2001 |

*Primary Examiner*—Thor S. Campbell
(74) *Attorney, Agent, or Firm*—Browdy and Neimark, P.L.L.C.

(57) ABSTRACT

The invention relates to a cooking appliance comprising a case (1) and a vessel (2). Said vessel is intended to receive a cooking bath and is equipped with a draining device (10) which is used to drain the contents of the vessel (2) into a draining container (3), said container being removably-disposed in relation to the case (1). According to the invention, the draining device (10) comprises a thermostatic valve (16) consisting of a heat-sensitive mechanical element which moves according to the temperature.

16 Claims, 2 Drawing Sheets

APPARATUS FOR HEATING A VESSEL CONTAINING FOODSTUFFS

The present invention concerns an apparatus for heating a vessel containing liquid or solid foodstuffs, such as an apparatus used for heating a baby bottle, or a small jar intended for baby food, or dishes containing food for young children.

In the known devices for heating baby foods, heat is produced by electric resistances disposed in proximity to the vessel to be heated, exchange of heat with this latter being able to take place via the sheath of air that surrounds the receptacle, by steam or by water.

The heating devices currently used function on the principle of a double boiler, being constituted by a heating tank having a certain quantity of water into which the baby bottle or the small jar to be heated is plunged. Such a device is described in the document DE 878 990. The temperature regulation of such a device is effected by a thermostat that cuts off the current to heating element of the tank at predetermined temperatures thereof. With such a regulation it is difficult to arrive at an optimum temperature in the vessel to be heated. Moreover, the vessel being immersed in the tank containing hot water, the temperature of this latter continues to rise even after heating is halted. The greatest drawback of such a device remains the substantial heating time due to the thermal inertia of the water to be heated.

These drawbacks have been reduced in part by steam heating devices such as described in the documents U.S. Pat. No. 1,977,482 or FR 2 753 071. In these documents, the vessel to be heated is a baby bottle placed in a heating enclosure above a tank containing water and heated by an electric resistance, the enclosure being closed at the upper part by a lid having an orifice for communicating with the atmosphere. The electric resistance transforms water contained in the tank into steam that heats the baby bottle. This device provides shorter heating times than the preceding ones, but it is nevertheless necessary to wait a rather long time to arrive at heating and then evaporating the water of the tank. Moreover, the outer surface of the baby bottle being very hot due to contact with the steam, the user can be burned when grasping the baby bottle immediately after the end of heating.

There is known moreover from the document FR 2 788 677 in the name of the applicant, an apparatus for cooling beverages conditioned by utilizing a pump that aspirates ice water from a reservoir and sends it over the cap of the bottle to be cooled. However, this apparatus, being designed solely for cooling a bottle, is costly, since it makes use of expensive components, notably an electric pump. Moreover, the spreading of the water on the bottle being done in a random manner, this apparatus must use a temperature sensor in order to function correctly, which increases even more the cost and the complexity of the apparatus.

The goal of the invention is to overcome the above-cited drawbacks and to propose an apparatus for heating in a very rapid manner vessels containing foodstuffs and to assure an optimal temperature of the foodstuff to be heated.

Another goal of the invention is an apparatus for heating vessels containing foodstuffs that is able to assure a stability of the temperature of the contents of the vessel and that permits at the same time a grasping in complete safety of the vessel from the end of the heating.

A supplementary goal of the invention is an apparatus for heating vessels containing foodstuffs that is reliable in operation while presenting a simple structure, and being easy to fabricate commercially for minimum costs.

These goals are achieved with an apparatus for heating a vessel containing foodstuffs, by contact with a fluid, having, in the lower part of said vessel, a reservoir for supplying a fluid and a unit for heating said fluid, by the fact that said apparatus has a thermal pump able to transfer, through an upwardly extending conduit opening into said heating unit, a predetermined flow of heated fluid to a distributing organ oriented toward the wall of said vessel.

By fluid one understands a liquid or a gas, for example water, steam or any other heat carrying fluid able to store and transport heat between the heating unit and the vessel to be heated.

According to the invention, the apparatus has a thermal pump able to transfer heated fluid toward the vessel containing the foodstuffs. By thermal pump one understands a device for heating and lifting fluid having a heating unit connected, upstream, by a one-way valve, to a fluid reservoir and, downstream, to an upwardly extending conduit or return tube permitting flow of the heated liquid, for example via a distributing organ, toward or onto the vessel to be heated. The one-way valve permits the admission of fluid from the reservoir into heating unit, but prevents any return toward the reservoir.

The unit for heating the fluid is constituted by a fluid circulation pipe in thermal communication with an electric heating element. The fluid circulation pipe forming a boiler can be a channel bent into a horseshoe shape connected to an electrically heated plate or to an electric resistance and, by this fact, the fluid passing through rises rapidly in temperature.

Such a thermal pump is arranged between the reservoir for supplying fluid and the vessel to be heated. Thus, the fluid from the reservoir arrives in the boiler by gravity, while passing through the one-way valve. The electric resistance rapidly heats the fluid, for example the water present in the boiler, bringing it to boiling. The vapor pressure provokes a rise of the water in the upwardly extending conduit, then expulsion thereof toward the vessel to be heated. The boiler having evacuated the totality of the fluid that was contained therein, the pressure falls due to the exposure to air following the emptying of the upwardly extending conduit. The boiler is then filled again with fluid coming from the reservoir and the cycle recommences. Such a thermal pump thus assures flow of the heated fluid above the level of water in the reservoir in a simple and economical manner, without requiring more sophisticated fluid pumping means.

Another advantage of the utilization of such a heating unit is that one arrives at controlling and maintaining constant the temperature of the fluid leaving the boiler, by a simple thermostatic regulation of the electric heating element of this latter. Thus, by knowing: the temperature of the fluid leaving the boiler which is constant and the flow of fluid, i.e. the quantity of fluid delivered, which is equal to the capacity of the boiler, and the contact time of the fluid with the vessel, one can determine with precision the final heating temperature of the foodstuffs contained in the vessel. One can thus choose the duration of heating of said vessel as a function of the quantity and of the contents of the vessel.

Advantageously, said vessel is arranged at the interior of an enclosure for recovery of the fluid connected by a recycling conduit to said reservoir.

One can certainly imagine sending the heated fluid toward the vessel placed in a recovery enclosure that could collect and hold this fluid in a space surrounding the vessel. One could equally imagine emptying this fluid toward the exterior of the apparatus. One chooses however to recycle it by sending it toward the reservoir, thus obtaining a closed circuit functioning of the fluid at the interior of the apparatus, which is clearly more economical and proves to be of a more practical utilization.

Preferably, said vessel is supported by a grid above the level of the fluid in said enclosure.

By grid there is understood a plate for separating the two volumes having at least one traversing orifice that lets the fluid pass from one volume to the other. The grid supporting said vessel preferably has a passage cross section permitting a flow rate through the grid greater than the flow rate of the boiler. By this fact, the vessel does not remain immersed in the heated fluid and its temperature no longer continues to increase once the heating is halted, which has the effect that the vessel can retain its initially programmed temperature.

Advantageously, said apparatus comprises a lid for closing said enclosure.

This permits heating of the vessel in a closed atmosphere, which present the advantage of being more rapid and of maintaining constant the temperature of the vessel for a certain time after heating is halted.

Usefully, said thermal pump transfers the fluid from the reservoir toward the distributing organ intermittently.

One could certainly imagine a thermal pump associated with a boiler having a sufficiently large capacity to send at one time the heated fluid toward the vessel containing the foodstuffs to be heated, or even in being associated with a one-way valve having a small play. In a variant, one chooses a boiler having a lesser capacity, since it arrives more rapidly at temperature, associated with a valve having a sufficiently large play to permit intermittent functioning. This boiler is going to send, in a repetitive manner, the heated fluid in bursts toward said vessel, the quantity sent at one time corresponding to the capacity of the boiler. The number and the volume of bursts sent towards the vessel in a predetermined period of time define the heat supply of the fluid to the vessel to be heated. By this fact, in choosing the number of bursts of a known volume of a fluid having a known heat capacity, one can easily adapt it to a vessel having a given volume and given content. Thus, by varying the number of bursts, one can utilize the apparatus with vessels having different volumes and contents.

Advantageously, the distributing organ opens into the upper part of said vessel.

One could imagine that the distributing organ sends the heated fluid to the lower or side part of the vessel. One prefers however a spraying onto the upper part of the vessel to be heated, since the fluid that arrived at the upper part then flows by gravity along the walls of the vessel, which permits it a longer contact time, thus improving the heat transfer with this latter.

Preferably, said distributing organ is a chute having at least one fluid flow orifice oriented toward said vessel.

One should be able to, of course, imagine a spraying down of the vessel, in which case the conduit arriving from the boiler would open into a sprayer, or sprinkler, head placed above the vessel to be heated; or even an indirect spraying of the vessel in which the fluid arriving from the boiler would be projected onto the interior surface of a dome for distributing the fluid that would then send it toward the vessel to be heated. One prefers however a spraying in which the heated fluid is channeled by a conduit which is terminated by a chute opening into a flow orifice oriented toward said vessel, since thus one arrives at channeling, orienting, and even calibrating in a more precise manner the fluid jet sent toward the vessel to be heated.

Advantageously, said chute at least partially surrounds said vessel in its upper part.

For this, the chute has an inner diameter equal to or greater than that of the recovery enclosure, several orifices being provided in its walls to spray the vessel to be heated at least partially on the periphery of its upper part, which offers a more uniform and more rapid heating.

Preferably, said chute has several flow orifices of a predetermined diameter uniformly spaced on its periphery.

The number and the diameter of the orifices determine the flow rate of fluid that sprays the vessel. The uniform spacing of the orifices on the periphery of the chute permits a homogeneous heating of the contents of the vessel. In a variant, one can imagine a device for regulating the flow in the form, for example, of a plate that is mounted to be movable with respect to the chute permitting partial blocking of certain orifices in order to adapt the flow rate of the fluid to the volume, to the contents or to the size of the vessel to be heated.

Advantageously, the apparatus of the invention comprises a housing at the interior of which is arranged said enclosure situated above said reservoir which is raised with respect to said heating unit, a heating unit communicating by an upwardly extending conduit with said chute.

Such a construction making use of tiered elements permits a simple closed circuit circulation of the fluid, which flows by gravity from the recovery enclosure into the reservoir and from there into the heating unit, from where it is sent to the upper part by the thermal pump.

Preferably, the apparatus of the invention comprises a time measuring unit controlling the operation of said heating unit.

The time measuring unit can be an electromechanical or electronic regulator having graduations corresponding to the heating time or to the quantity of the product to be heated. The regulator is connected to an electronic circuit that controls the starting and the stopping of the heating depending on the pre-selected time, and which thus determines the final temperature of the vessel to be heated.

Advantageously, the apparatus of the invention comprises means for regulating the temperature of the electric heating element of said heating unit permitting it an operation at least two distinct temperatures.

Thus, by causing the temperature of the heating unit to vary one arrives at obtaining variable heating times for a same quantity of product to be heated. Incidentally, one can imagine that, by using water as the heat transfer fluid and an appropriate boiler, the apparatus of the invention can distribute hot water and/or steam toward the walls of the vessel to be heated. For example, one boiler suitable for producing hot water and/or steam can be a vertical boiler with a bend such as described in the document FR 2 721 381 in the name of the applicant, or a horizontal or vertical U-shaped boiler, the heating power and/or time of which are chosen to obtain water and/or steam at the outlet of the boiler.

Preferably, the apparatus according to the invention has means forming a support for said vessel at the interior of said enclosure permitting use of the apparatus with vessels having different dimensions.

The means forming a support can be a movable grid and means for displacing it and fixing it at different heights in said enclosure, or a set of cylinders of different heights that can be arranged one by one in said enclosure as a function of the height of the vessel to be heated. Thus, by using very simple adaptation means one can arrange more or less deep vessels at the interior of the same apparatus, such as baby bottles of different dimensions, small jars or dishes containing the food to be heated.

Advantageously, said invention concerns a baby bottle heater having, at the lower part of the vessel to be heated, a water reservoir and a unit for heating the water contained in the reservoir, by the fact that the baby bottle heater has a thermal pump able to transfer, via an upwardly extending conduit opening into said heating unit, a predetermined flow of heated water to a distributing organ oriented toward the walls of said vessel, the water then returning to the reservoir through a recycling conduit.

Such an apparatus assures a rapid heating of the contents of the baby bottle and a reliable regulation of the temperature at the interior of the baby bottle. Moreover, the heating being effected by streaming of hot water on the walls of the baby bottle, this latter can be grasped by the user when the heating ends without risk of burning.

The invention will be better understood from a study of the embodiments taken by way of non-limiting example and illustrated in the attached figures in which.

Figures 1, 2, 3, 4:
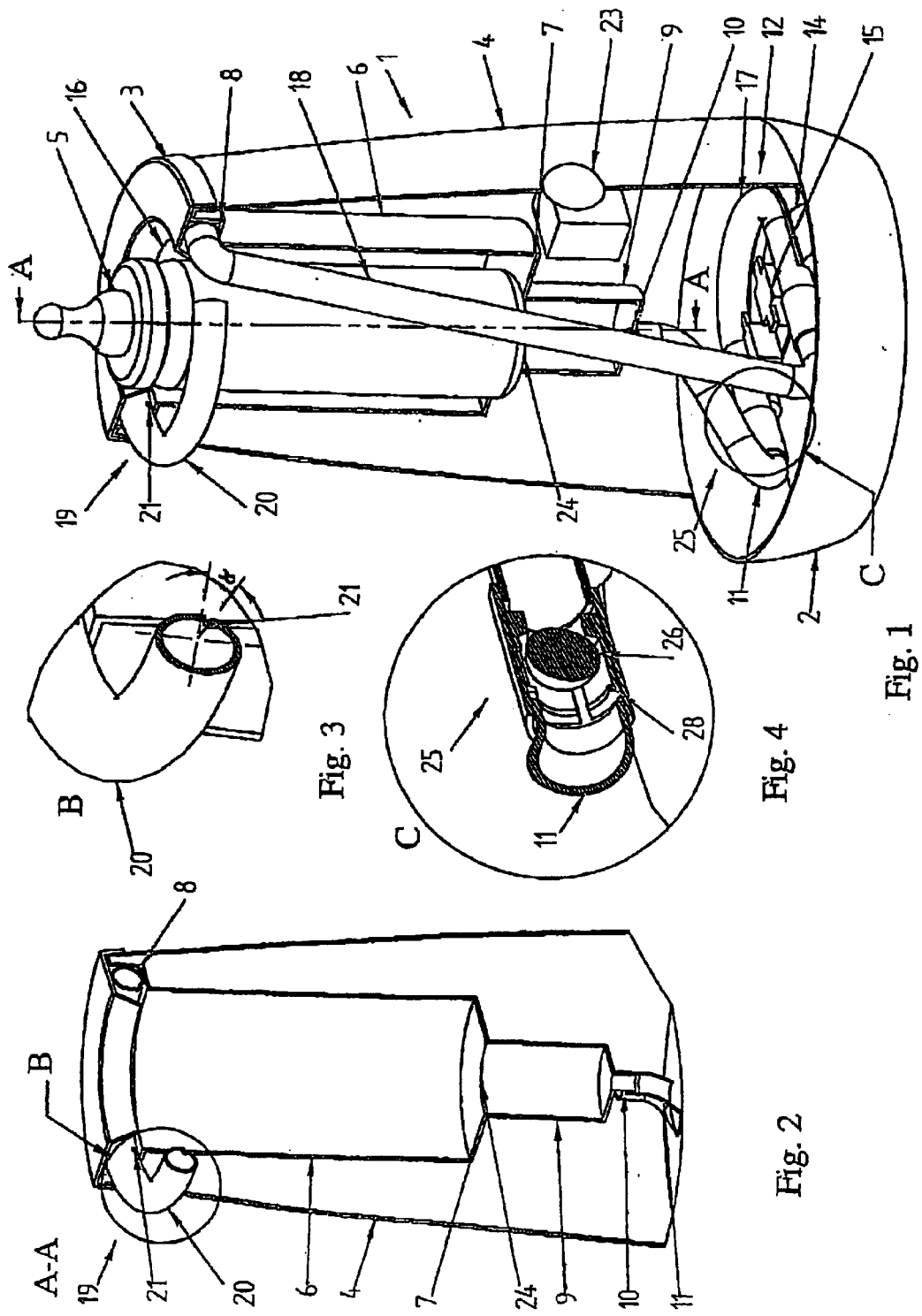
FIG. 1 represents a perspective view of an apparatus of the invention according to a first embodiment, one part of the lateral walls being removed to show the upper part of the apparatus in axial cross-section.
FIG. 2 is a view in partial cross-section of the apparatus of FIG. 1 while using a median plane A—A perpendicular to the plane of the axial cross-section of FIG. 1.
FIG. 3 represents a view to an enlarged scale of the detail B of FIG. 2.
FIG. 4 represents a view in axial cross-section to an enlarged scale of the detail C of FIG. 1.

FIG. 1 shows an apparatus according to a first embodiment of the invention and it is represented in a condition for heating a baby bottle, but it can equally be utilized to heat small jars or dishes containing food for babies. The apparatus comprises a housing 1 having a base 2 and a skirt 4 connecting it to the upper lid 3. At the interior of housing 1 is found a cavity 16 intended to receive the vessel to be heated.

Cavity 16 is embodied by an enclosure 6 preferably having a cylindrical form that is arranged and supported at the interior of housing 1. Enclosure 6 is sufficiently deep to be able to receive a vessel of the baby bottle type with large dimensions over its entire height. At the upper part, enclosure 6 has a rim 8 in the form of a gutter that assures the maintenance of a distributing organ 19, as will be described in detail below. At the lower part, enclosure 6 has a bottom wall 7 having one or several traversing orifices 24.

Bottom wall 7 separates enclosure 6 from fluid supply reservoir 9, the fluid being able to circulate from enclosure 6 to reservoir 9 via orifice 24.

Fluid reservoir 9 can be integral with enclosure 6 or mounted in a removable manner with respect to this latter and to housing 1 of the apparatus. According to a preferred variant of the embodiment of the invention, the fluid utilized is water and in the description that follows, reference will be made to the use of the apparatus with water, without however excluding other heat carrying fluids such as steam, oil, etc.

Reservoir 9 is connected via a flow orifice 10 to supply conduit 11 through which the fluid arrives at the heating unit forming a boiler 12. A one-way valve 25 is mounted in conduit 11 and it permits circulation of water from reservoir 9 toward boiler 12 and prevents any return of water from the boiler toward the reservoir. FIG. 4 shows valve 25 in the open position, this latter having a body 28 and a sphere 26 that is displaced by the pressure of the water at the interior of body 28 of valve 25.

Boiler 12 is constituted by a fluid circulation pipe 17 in the form of a U or a horseshoe, arranged in a horizontal plane at the interior of base two of the apparatus and of a heating element 14 having a form identical to that of pipe 12 against which it is fixed, in the lower part of this latter. Pipe 17 is made, for example, of a metallic material that is a good conductor of heat. Heating element 14 can be constituted by a sheathed resistance mounted in thermal communication, for example by welding, against pipe 17.

The assembly of boiler 12 is mounted on a support plate at the interior of base 2 of the apparatus. The boiler equally comprises a thermal regulation organ represented by thermostat 15, for example of the bimetallic blade type, electrically connected to heating element 14. Thermostat 15 is placed in the central zone of heating element 14 in the form of a U, fixed to the same support plate at the interior of base 2. Regulation can equally be effected with the aid of a NTC sensor in thermal contact with the boiler, a sensor that is connected to an electronic card that controls the heating time and power.

Boiler 12 is connected by an upwardly extending flow reversing conduit 18 to a distributing organ 19 situated in the upper part of housing 1 of the apparatus. Distributing organ 19 is constituted by a chute 20 provided with evacuation orifices 21. Chute 20 has a toroidal form and is arranged in the upper part on the periphery of enclosure 6. Chute 20 practically completely surrounds enclosure 6 and consequently vessel 5 positioned in a concentric manner at the interior of this latter. The inner diameter of chute 20 has dimensions close to those of the inner diameter of enclosure 6. The inner diameter of the cross-section of gutter 20 has dimensions equal to or even less than those of upwardly extending conduit 18 in order to prevent pressure loss in chute 6.

FIG. 2 shows a partial view in cross-section of the apparatus where one can note that chute 20 supported by the upper rim forming gutter 8 of enclosure 6. Upper lid 3 of housing 1 of the apparatus covers chute 20 in its upper part and presents an internal wall inclined in a manner to prevent water splashes toward the outside, the wall orienting them toward the inside of enclosure 6. Chute 20 has several orifices 21 disposed equidistantly on the periphery of its internal face. As is better seen in the detail of FIG. 3, orifices 21 have an angle of inclination a with the horizontal axis of the transverse cross-section of the chute, this angle being calculated in a manner such that the fluid jet has a good incidence with the wall of the vessel to be heated and such that it thus avoids splashing, while flowing along the wall of the vessel. In the framework of this example, the inclination angle a can be around 30°.

As is visible in FIG. 1, the apparatus equally comprises a control button 23 that commands the heating phase. Button 23 can be a regulator connected to an electric circuit that halts supply of heating element 14 as soon as a pre-selected period has passed. Button 23 can equally be a button for selection of a quantity of foodstuff to be heated that is connected to an electronic card for control of the heating phase.

In operation, the user begins by filling reservoir 9 with water. Reservoir 9 has a sufficiently large capacity to permit continuous operation of the boiler, without draining the thermal pump, this capacity being for example at least 300 ml. One-way valve 25 permits admission of the cold water from reservoir 9 into boiler 12. The user then places the vessel to be heated, for example a baby bottle 5, into cavity 16 of the apparatus and operates selection button 23 to control the heating phase as a function of the quantity of liquid to be heated contained in the baby bottle. Heating element 14 causes the temperature of the water to rise rapidly, bringing the latter to boiling almost instantaneously in boiler 12. The vapor pressure provokes the rise of the water in upwardly extending conduit 18, valve 25 preventing any return of this latter into reservoir 9. Hot water that arrives in chute 20 through upwardly extending conduit 18 is evacuated through orifices 21 and flows on the periphery of the baby bottle to be heated. After flow of the hot water on the baby bottle, this latter returns to reservoir 9 by passing through flow orifice 24 of wall 7 of enclosure 6. Following emptying of upwardly extending conduit 18, the pressure at the interior of the boiler drops, which causes the latter to be refilled with water through valve 25 and a new cycle begins.

During the entire heating phase, chute 20 waters baby bottle 5 with bursts of water that follow one another at a timed interval that is a function of the capacity of boiler 12 and of the power of heating element 14. The water flowing in bursts at constant temperature, it is sufficient to cause the flow time to vary in order to vary the final temperature of the baby bottle.

In one example of construction of the invention, this interval is 2 to 3 seconds for a boiler having a capacity of 9.5 ml and a heating element power of 500W which furnishes hot water at a temperature of around 80 to 85° C. Thus, a baby bottle is rapidly brought to the optimum temperature for consumption comprised between 35 and 45° C., in a delay of around 2 to 3.5 min, this delay being determined as a function of the quantity of liquid that it contains. The fact is noted that the time for heating the baby bottle is much shorter compared to a conventional heating in a double boiler that is around 6 to 7 min. In the same manner, a small jar containing a pasty or solid foodstuff reaches the optimum temperature for consumption in a period of 6 to 8 min with the apparatus of the invention compared to a period of 20 min with a conventional apparatus.

In an advantageous variant of construction of the invention, the apparatus has a lid in the form of a bell that covers the upper part of housing 1. This permits the efficiency of the apparatus to be improved, by reducing the heating time, and equally permitting assurance of a function of maintaining the vessel warm after stopping the apparatus. The water not remaining in enclosure 6, but in reservoir 9 situated under the enclosure, the temperature of the baby bottle no longer increases after halting of the heating. In addition, the lid permits this final temperature to be maintained constant during at least 30 min.

In a variant not shown in the figures, the apparatus of the invention is provided for use with vessels to be heated having different dimensions. For this, one can arrange in enclosure 6 several cylindrical supports having a perforated bottom, each support having a height adapted to that of the vessel to be heated in a manner such that the upper part of this latter is in the vicinity of the watering zone of chute 20.

Figure 5:
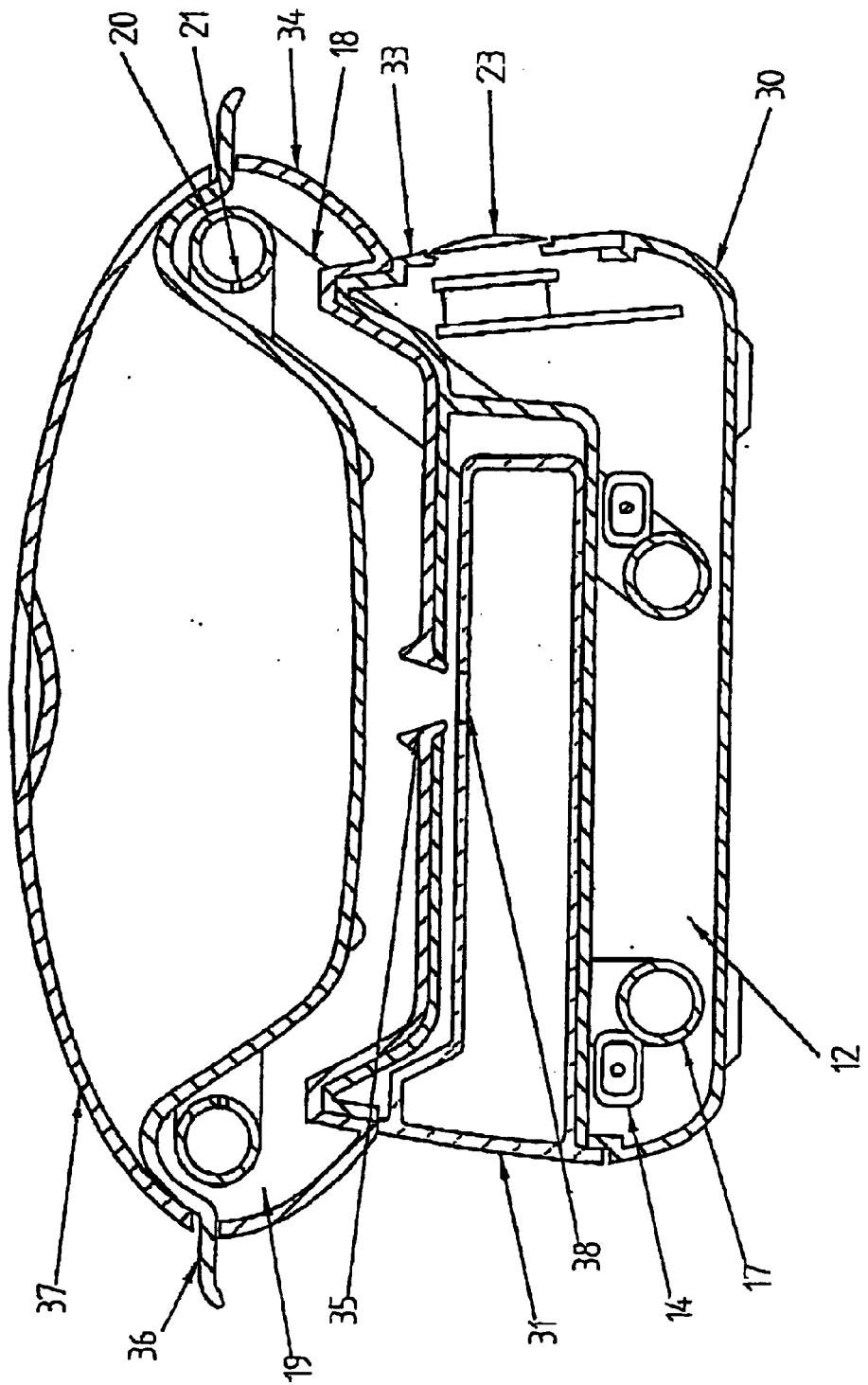
FIG. 5 shows an axial cross-section of an apparatus according to a second embodiment of the invention.

FIG. 5 illustrates a heating apparatus for a foodstuff according to a second embodiment of the invention in which a same reference designates a similar part of the first embodiment. The apparatus has a modular structure in being constituted of several parts stacked at least in part in a removable manner. The apparatus comprises a lower housing 30 enclosing heating element 14, fluid circulation pipe 17 and the organs for regulation and for control of the heating. An upper housing 33 is supported by lower housing 30. A water reservoir 31 is removably mounted at the interior of housing 33. Housing 33 supports at its upper part a tank 34 forming an enclosure for recovery of hot water that is sprinkled on the vessel to be heated represented in this figure in the form of a dish 36 containing the foodstuff to be heated. A chute 20 having evacuation orifices 21 surrounds vessel 26 in its upper part. Lid 37 assures maintaining the contents of dish 36 warm.

The operation is identical to that of the apparatus according to the first embodiment. Thus, after placing the apparatus into operation, cold water contained in reservoir 31 arrives in pipe 17 of boiler 12 and is brought to boiling almost instantaneously. The hot water passes by a thermosiphon effect into upwardly extending conduit 18 and from there into chute 20 from where it is evacuated through orifices 21 toward the periphery of dish 36. After flow on the periphery of dish 36, the hot water returns to reservoir 31 through flow orifice 35 of tank 34 which is in communication with orifice 38 of reservoir 31. Several cycles thus follow one another until obtaining the optimum heating temperature in dish 36.

Other variants and embodiments of the invention can be envisioned without departing from the framework of its claims. Thus, one could imagine using the apparatus of the invention as a sterilizer by sending steam into a closed enclosure containing the vessel to be sterilized.

What is claimed is:

1. Apparatus for heating a vessel (5) containing foodstuffs, by contact with a fluid, having, below said vessel (5), a reservoir (9, 31) for supplying a fluid and a thermal pump including a unit (12) for heating said fluid, characterized in that said thermal pump is able to transfer, through an upwardly extending conduit (18) opening into said heating unit (12), a predetermined flow of heated fluid to a distributing organ (19) oriented toward the wall of said vessel (5).

2. Apparatus according to claim 1, characterized in that said vessel (5) is arranged at the interior of an enclosure (6, 34) for recovery of the fluid connected by a recycling conduit (24, 35) to said reservoir (9, 31).

3. Apparatus according to claim 2, characterized in that said vessel (5) is supported by a grid (7) above the level of the fluid in said enclosure.

4. Apparatus according to one of claim 2, characterized in that said apparatus comprises a lid (37) for closing said enclosure (6, 34).

5. Apparatus according to claim 1, characterized in that said thermal pump transfers the fluid from the reservoir (9, 31) toward the distributing organ (19) intermittently.

6. Apparatus according to claim 1, characterized in that said distributing organ (19) opens into the upper part of said vessel (5).

7. Apparatus according to claim 1, characterized in that said distributing organ (19) is a chute (20) having at least one fluid flow orifice (21) oriented toward said vessel.

8. Apparatus according to claim 7, characterized in that said chute (20) at least partially surrounds said vessel (5) in its upper part.

9. Apparatus according to claim 7, characterized in that said chute (20) has several flow orifices (21) of a predetermined diameter uniformly spaced on its periphery.

10. Apparatus according to claim 2, characterized in that it comprises a housing (1) at the interior of which is arranged said enclosure (6) situated above said reservoir (9) which is raised with respect to said heating unit (12), heating unit (12) communicating by the upwardly extending conduit (18) with said chute (20).

11. Apparatus according to claim 1, characterized in that it comprises a time measuring unit controlling the operation of said heating unit (12).

12. Apparatus according to claim 1, characterized in that it comprises means (15) for regulating the temperature of the electric heating element (14) of said heating unit (12) permitting it an operation at least two distinct temperatures.

13. Apparatus according to claim 1, characterized in that it has means forming a support for said vessel (5) at the interior of said enclosure (6) permitting use of the apparatus with vessels having different dimensions.

14. A heater for heating a baby bottle, comprising a water reservoir (9) disposed below a region of said heater that will receive the baby bottle, and a thermal pump including a unit (12) for heating the water contained in the reservoir (9), characterized in that said thermal pump is able to transfer, via an upwardly extending conduit (18) opening into said heating unit (12), a predetermined flow of heated water to a distributing organ (19) oriented toward the walls of said vessel (5), the water then returning to the reservoir (9) through a recycling conduit (24).

15. The heater according to claim 14, wherein said unit (12) for heating said fluid has an inlet and an outlet, and said thermal pump further comprises a one-way valve connected between said reservoir and said inlet of said unit (12) for allowing fluid to flow only in a direction from said reservoir, and wherein said upwardly extending conduit (18) is connected to said outlet of said unit (12).

16. Apparatus for heating a vessel (5) containing foodstuffs, by contact with a fluid, having, in the lower part of said vessel (5), a reservoir (9, 31) for supplying a fluid and a thermal pump including a unit (12) for heating said fluid, characterized in that said thermal pump is able to transfer, through an upwardly extending conduit (18) opening into said heating unit (12), a predetermined flow of heated fluid to a distributing organ (19) oriented toward the wall of said vessel (5), wherein said unit (12) for heating said fluid has an inlet and an outlet 5 and said thermal pump further comprises a one-way valve connected between said reservoir and said inlet of said unit (12) for allowing fluid to flow only in a direction from said reservoir, and wherein said upwardly extending conduit (18) is connected to said outlet of said unit (12).

* * * * *